(12) United States Patent
Li et al.

(10) Patent No.: US 11,790,478 B2
(45) Date of Patent: Oct. 17, 2023

(54) METHODS AND APPARATUS FOR MAPPING SOURCE LOCATION FOR INPUT DATA TO A GRAPHICS PROCESSING UNIT

(71) Applicant: QUALCOMM Incorporated, San Diego, CA (US)

(72) Inventors: Liang Li, San Diego, CA (US); Elina Kamenetskaya, Belmont, MA (US); Andrew Evan Gruber, Arlington, MA (US)

(73) Assignee: QUALCOMM Incorporated, San Diego, CA (US)

( * ) Notice: Subject to any disclaimer, the term of this patent is extended or adjusted under 35 U.S.C. 154(b) by 568 days.

(21) Appl. No.: 16/984,024

(22) Filed: Aug. 3, 2020

(65) Prior Publication Data

US 2022/0036498 A1 Feb. 3, 2022

(51) Int. Cl.
*G06T 1/20* (2006.01)
*G06T 15/00* (2011.01)
*G06F 17/14* (2006.01)
*G06F 9/50* (2006.01)
*G06F 9/30* (2018.01)
*G06F 17/16* (2006.01)

(52) U.S. Cl.
CPC ............ *G06T 1/20* (2013.01); *G06F 9/3001* (2013.01); *G06F 9/30032* (2013.01); *G06F 9/30145* (2013.01); *G06F 9/5066* (2013.01); *G06F 17/142* (2013.01); *G06F 17/16* (2013.01); *G06T 15/005* (2013.01)

(58) Field of Classification Search
None
See application file for complete search history.

(56) References Cited

U.S. PATENT DOCUMENTS

| | | | | |
|---|---|---|---|---|
| 2005/0078599 | A1* | 4/2005 | Zhidkov | H04L 27/2679 370/208 |
| 2019/0325621 | A1* | 10/2019 | Wang | G06N 3/045 |
| 2021/0349639 | A1* | 11/2021 | Rangan | H03M 7/3088 |

\* cited by examiner

*Primary Examiner* — Joni Hsu
(74) *Attorney, Agent, or Firm* — Procopio, Cory Hargreaves & Savitch LLP

(57) ABSTRACT

The present disclosure relates to methods and apparatus for mapping a source location of input data for processing by a graphics processing unit. The apparatus can configure a processing element of the graphics processing unit with a predefined rule for decoding a data source parameter for executing a task by the graphics processing unit. Moreover, the apparatus can store the parameter in local storage of the processing element and configure the processing element to decode the parameter according to the at least one predefined rule to determine a source location of the input data and at least one relationship between invocations of the task. The apparatus can also load, to the local storage of the processing element, the input data from a plurality of memory addresses of the source location determined by the parameter. A one logic unit can then execute the task on the loaded input data.

25 Claims, 6 Drawing Sheets

METHODS AND APPARATUS FOR MAPPING SOURCE LOCATION FOR INPUT DATA TO A GRAPHICS PROCESSING UNIT

TECHNICAL FIELD

The present disclosure relates generally to processing systems and, more particularly, to one or more techniques for mapping source location data to a graphics processing unit for improved task performance.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU is configured to perform the processes in a graphics processing pipeline. For example, programmable shader units may be provided in a GPU within a graphics processing pipeline for performing specialized functions of computer graphics special effects. Moreover, GPUs gain performance efficiencies for executing such processes by using parallel hardware to run tasks for these processes in parallel. In current implementations, a shader unit will allocate its local storage to load and store all source location data of the workload for the operation to be executed (e.g., the special effect). By doing so, the shader unit consumes significant memory to load and store this source location data and thus reduces overall performance and power of the GPU. Therefore, there has developed an increased need for improved utilization of system resources to perform parallel operations by a GPU.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a GPU that includes a graphics processing pipeline. The apparatus may configure a processing element of the graphics processing unit with at least one predefined rule for decoding a data source parameter for a task to be executed by the graphics processing unit; store the data source parameter in local storage of the processing element; configure the processing element to decode the data source parameter according to the at least one predefined rule to determine a source location of the input data and at least one relationship between invocations of the task; load, to the local storage of the processing element, the input data from a plurality of memory addresses of the source location that are determined by the decoded data source parameter; and configure at least one logic unit of the processing element to execute the task on the loaded input data to generate output data. Moreover, the processor can further configured to configure the at least one logic unit to generate the output data based on a matrix multiply operation. The input data may comprise at least one input matrix and the data source parameter comprises a single element value within the at least one input matrix. The at least one processor can further configured to configure the at least one logic unit to decode the single element value to determine the source location of the plurality of memory addresses. Ina addition, each data input value of the at least one matrix is stored in a respective memory address of the plurality of memory addresses and the at least one processor may be further configured to control the at least one logic unit to calculate the output data by multiplying the at least one input matrix by one or more additional input matrices to generate the output data. The at least one processor can further be configured to store the output data in the local storage of the processing element. In addition, the at least one processor may further be configured to define a mode of operation for the at least one logic unit to execute the task. In an aspect, the task may be a fast Fourier transform operation of the loaded input data to generate the output data and the at least one processor may be configured to configure the at least one logic unit to determine shuffle instructions for the fast Fourier transform operation based on the defined mode of operation. Moreover, the operation executed by the at least one logic unit is a deep learning operation and the input data is image data and the output data for the executed deep learning operation indicates at least one of an identification of content of the image data, a prediction of a next image in an image sequence of the content including the image data, and an identification of a missing part of the image data. In addition, the at least one processor may be configured to load the input data to the local storage of the processing element from the electronic memory that is located external to the graphics processing unit. Moreover, the processing element may be a shader unit of the graphics processing unit.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
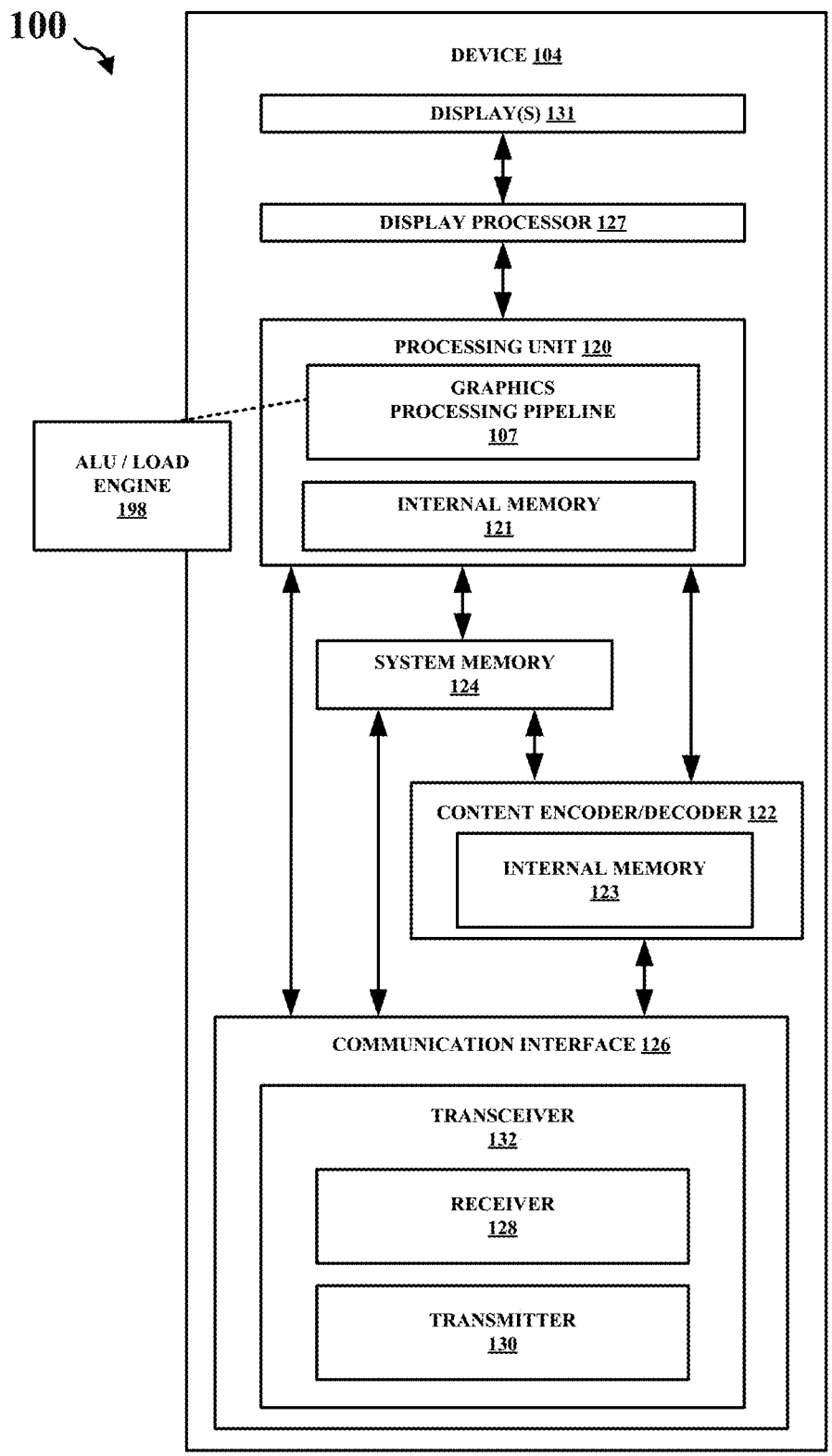
FIG. 1 is a block diagram that illustrates an example content processing system configured to implement one or more techniques of this disclosure.

Generally, a graphics processing unit (GPU) is a specialized electronic circuit designed to rapidly manipulate and alter memory to accelerate the creation of images in a frame buffer intended for output to a display device. GPUs can be in embedded systems, mobile phones, personal computers, workstations, and the like, as described in detail below with respect to FIG. 1. The highly parallel structure of GPUs makes them more efficient than general-purpose central processing units (CPUs) to process large blocks of data in parallel. GPUs include one or more programmable shading units 40 that may concurrently execute multiple instances of what is commonly referred to as a "shader program." These shader programs may be referred to as "fibers" or "threads" (both of which may refer to a stream of instructions that form a program or thread of execution).

In most compute works, such as image processing or deep learning algorithms and architectures (e.g., matrix multiply operations), each task invocation for tasks running in parallel can be derived by a single seed input. However, shader units in a GPU perform such operations by allocating its local storage to hold all fiber source location data for each subgroup, i.e., parallel task of the operation. Effectively, a significant amount of source input data is loaded into the shader units, which in turn reduces the overall performance and power of the GPU. Aspects of the present disclosure provide apparatuses and methods for mapping source location data to a graphics processing unit for improved task performance. More particularly, the present disclosure provides for techniques of configuring one or more logic units of the GPU to decode a single data location parameter to determine the source location of the input data and relationships for invocations of the subgroups of operation. Moreover, the one or more logic units is configured for decoding the data location parameter to load the input data from a plurality of memory addresses of electronic memory that are identified by the decoded data location identifier. The one or more logic units then executes an operation on the loaded input data to generate output data for the designated operation (e.g., image processing or deep learning operation).

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein, one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different technologies, system configurations, networks, and processing protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, and the like, whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, analyzing graphical content, and/or reducing the load of a processing unit, i.e., any processing unit configured to perform one or more techniques described herein, including a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content processed by one or more processes of a graphics processing pipeline.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content processing system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. In further examples, the results of the graphics processing may not be displayed on the device, e.g., the first and second display may not receive any frames for presentment thereon. Instead, the frames or graphics processing results may be transferred to another device.

According to an exemplary aspect, the processing unit 120 may include an internal memory 121. Moreover, in the exemplary aspect, the processing unit 120 is configured to perform graphics processing, i.e., in graphics processing pipeline 107 as will be discussed in more detail below. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

In an exemplary aspect, the internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104.

According to an aspect, the processing unit 120 includes one or more arithmetic logic units (ALUs), for example, one or more graphics texture ALUs that are configured to perform texture filtering to determine texture colors for texture mapped pixels based on colors of nearby texels (i.e., pixels of the texture). As will be described in detail below, the processing unit 120 can configured to map source location data to one or more ALUs for improved task performance.

It is further noted that if the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), ALUs, digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, the graphics processing pipeline 107 can include an ALU/load engine 198 provided for mapping source location data to the GPU for improved task performance. In an aspect, the GPU includes one or more data processing elements, in in particular, one or more shader units that typically allocates local storage to hold all source location data for a workload of an operation to be executed in the graphics pipeline 107. According to an aspect, the ALU/load engine 198 may configure the respective component (e.g., the shader unit) within the GPU to decode a single input fiber location to load the input data (e.g., workloads) to the local storage thereof for efficient execution of the subgroup.

In general, it is noted that a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a di splay or di splay device, a television, a television set-top box, an intermediate network device, a digital media player, a video streaming device, a content streaming device, an in-car computer, any mobile device, any device configured to generate graphical content, or any device configured to perform one or more techniques described herein.

Figure 2:
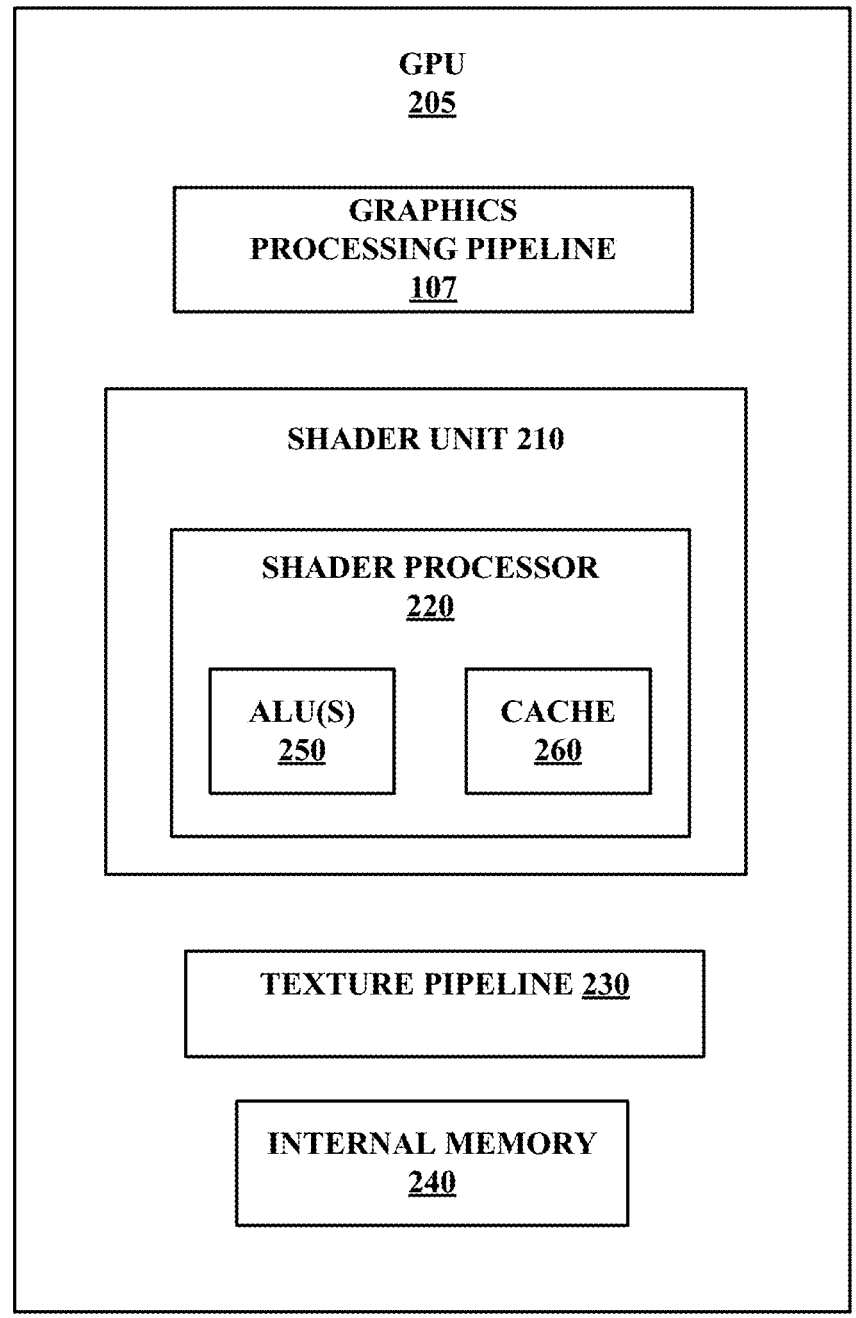
FIG. 2 is a block diagram that illustrates an example graphics processing unit in accordance with one or more techniques of this disclosure.

FIG. 2 is a block diagram 200 that illustrates an example graphics processing unit (GPU 205) in accordance with one or more techniques of this disclosure. In general, the GPU 205 can correspond to an example of the processing unit 120 (or a component coupled thereto) as described above with respect to FIG. 1. In an aspect, the processing unit 120 can be GPU 205, which is a specialized electronic circuit designed to rapidly manipulate and alter memory to accelerate the creation of images in a frame buffer intended for output to a display device, such as display 131.

FIG. 2 shows an aspect in which the processing unit 120 comprises GPU 205 to perform the respective image processing operations. Specifically, GPU 205 may be configured to perform graphics operations to render one or more graphics to display 131, as described above. In a typical operation, when one of the software applications executing on the device 104 requires graphics processing, the processing unit 120 may provide graphics commands and graphics data to GPU 205 for rendering to display 131. The graphics data may include texture information, drawing commands, and the like. As also described above, GPU 205 is built with a highly-parallel structure that provides more efficient processing of complex graphic related operations.

As shown, GPU 205 may include a plurality of processing elements, such as one or more shader units (i.e., shader unit 210), that are configured to operate on multiple vertices or pixels in a parallel manner. Moreover, GPU 205 may include internal memory 240 (e.g., corresponding to internal memory 121 of FIG. 1), such that GPU 205 may directly read data from and write data to internal memory 240 without using a bus. In other words, GPU 205 may process data locally using a local storage, instead of off-chip memory. This configuration will enable GPU 205 to operate in a more efficient manner by eliminating the need of GPU 205 to read and write data via a bus, which may experience heavy bus traffic. In some instances, however, GPU 205 may not include a separate memory, but instead utilize system memory 124 via a bus.

In an aspect, internal memory 240 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media. In addition, internal memory 240 may be coupled to cache 260 of shader unit 210, the details of which will be described below.

As further shown in FIG. 2, GPU 205 includes the one or more shader units 210, graphics processing pipeline 107, and texture pipeline 230. Moreover, one or more shader programs (e.g., "fibers" or "threads") may be executed by shader units 210 in GPU 205. Shader units 210 may also include one or more shader processors 220, each of which may include one or more components for fetching and decoding operations, one or more arithmetic logic units (ALUs) 250 for carrying out arithmetic calculations, one or more local caches 260, which can be other types of local memory and/or registers in various instances.

In a typical operation, GPU 205 may designate the one or more shader units 210 to perform a variety of shading operations such as vertex shading, hull shading, domain shading, geometry shading, pixel shading, and the like by sending commands to shader units 210 to execute one or more of a vertex shader stage, a hull shader stage, a domain shader stage, a geometry shader stage, and a pixel shader stage in graphics processing pipeline 107. However, to execute these operations, the shader unit 210 in the GPU 210 will first allocate its local storage (e.g., cache 260) to hold all source location data for the workload, before then loading the input data to execute the operation.

In an aspect and referring back to FIG. 1, the processing unit 120 can include ALU/load engine 198, which can be a control element executed by shader processor 220 in one aspect. Alternatively, shader processor 220 can be a controller external to shader unit 210 and/or external to GPU 205. In either case, ALU/load engine 198 is provided for mapping source location data to the GPU 205, and, more particularly, to mapping the source location data to the local memory of the shader unit 210, such as cache 260, for example. In an aspect, the ALU/load engine 198 may configure the shader unit 210 to decode a single fiber input source for then loading the input data (e.g., workloads) to the local storage (e.g., cache 260) thereof for efficient execution of the respective subgroup.

Figure 3:
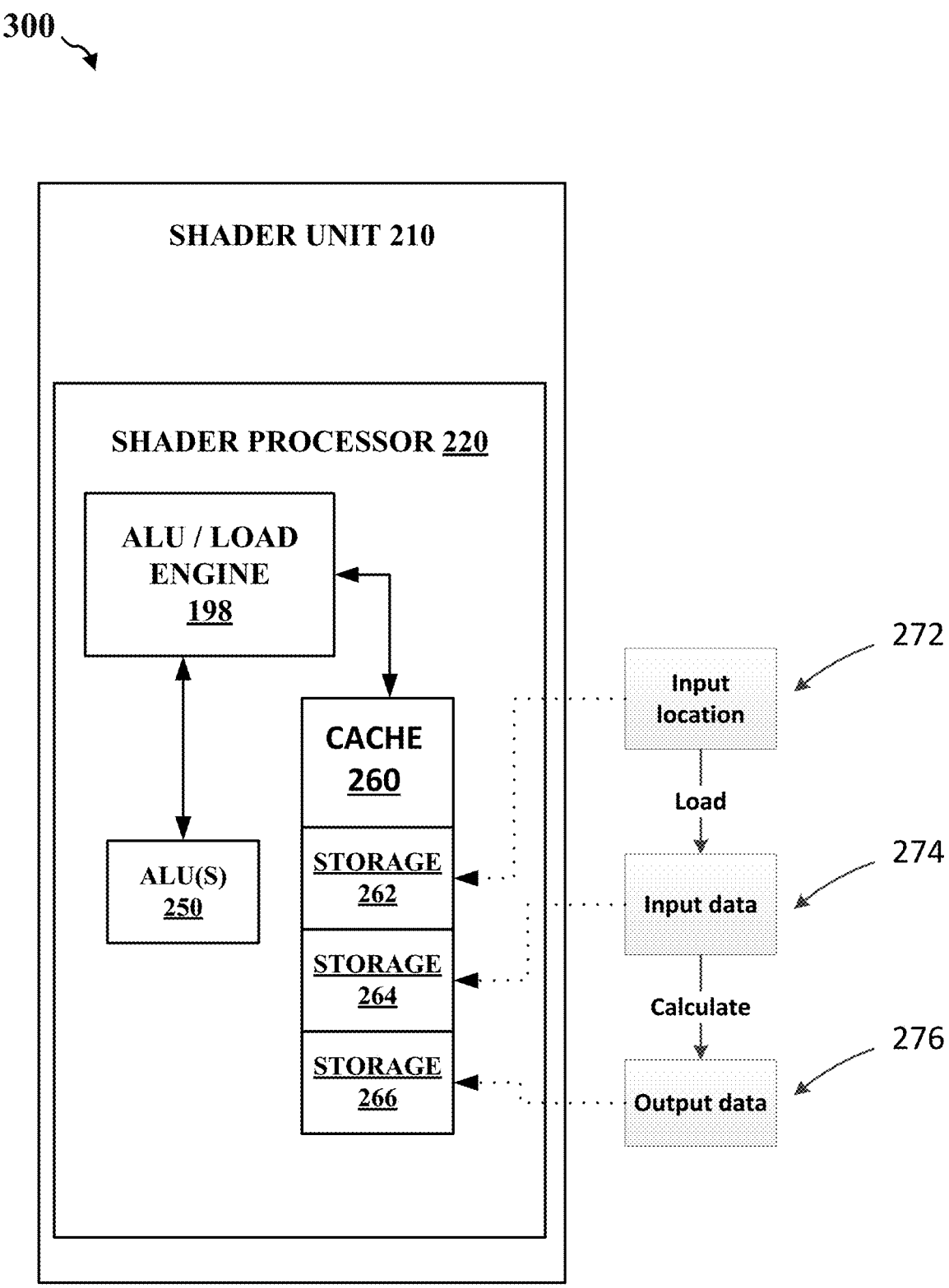
FIG. 3 is a block diagram that illustrates an example shader unit in accordance with one or more techniques of this disclosure.

FIG. 3 is a block diagram 300 that illustrates an example shader unit in accordance with one or more techniques of this disclosure. In this aspect, the ALU/load engine 198 is executed by shader processor 220 and configured to control operation of the one or more ALUs 250 as well as the reading and writing of data to and from the local memory of the shader unit 210 (e.g., cache 260). As further shown, cache 260 can include three sections of local memory storage 262, 264 and 266, which is directly coupled to the one or more ALUs 250 as elements of shader processor 220.

As described above, the GPU 205 may be configured to run parallel tasks, with each concurrently running task being considered a subgroup of the operation executed by the GPU 205. The process for the invocation of each subgroup is conceptually shown in blocks 272, 274 and 276. That is, input location 272 is first loaded in first local storage 262, which in turn configures shader processor 220 to load input data 274 to second local storage 264, before the operation is executed by the one or more ALUs 250 to generate output data 276 that is stored in third local storage 266.

In an aspect, the input location data 272 may be source location mapping data that maps the source location of the workload (i.e., the input data 274) to the second local storage 264. For example, the input data 274 can be image content that is stored in memory external to the GPU 205, such as image data stored in internal memory 124, for example. In another aspect, the input data 274 can be image content that is stored in memory the internal memory 121 that is external to the shader unit 210, for example.

In either case, shader processor 220 typically allocates subgroup local storage (e.g., local storage 262) to hold all the fiber source locations for the input data. In other words, for each data value of the workload, the shader processor 220 would load a corresponding fiber source location for that data value to the local storage. According to an exemplary aspect, the ALU/load engine 198 is configured with predefined decoded rules that identify the workload's source location and relationships between the invocations in a subgroup of the operation based on a single fiber input location for that subgroup. As a result, both the source location information can be significantly reduced or removed altogether.

According to an aspect, the single fiber input location can be considered data location identifier that is loaded or otherwise stored in the local storage 262 (e.g., the first section of the cache 260). The ALU/load engine 198 may be configured with predefined decoded rules to decode the source location of the workload (i.e., input data 274) based on this single fiber input. In other words, using the predefined decoding rules, the ALU/load engine 198 may be configured to access the input data (e.g., image content, pixel data or the like) from external memory and load the input data to local storage 264 according to a specific pattern for the memory as defined by the decoding rules. In other words, the decoding rules define the location for the input data in the local storage 264 and the relationships between the invocations for the subgroups of the operation. Thus, during invocation, the one or more ALUs 250 can access the input data from local storage 264, execute the designate operation, and generate output data 276 that is stored in local storage 266. By using a single fiber source input to map the source location data for the ALUs, the consumption of local storage (e.g., local storage 262) is significantly reduced since only a signal input value is loaded therein rather than all fiber source locations.

Figure 4:
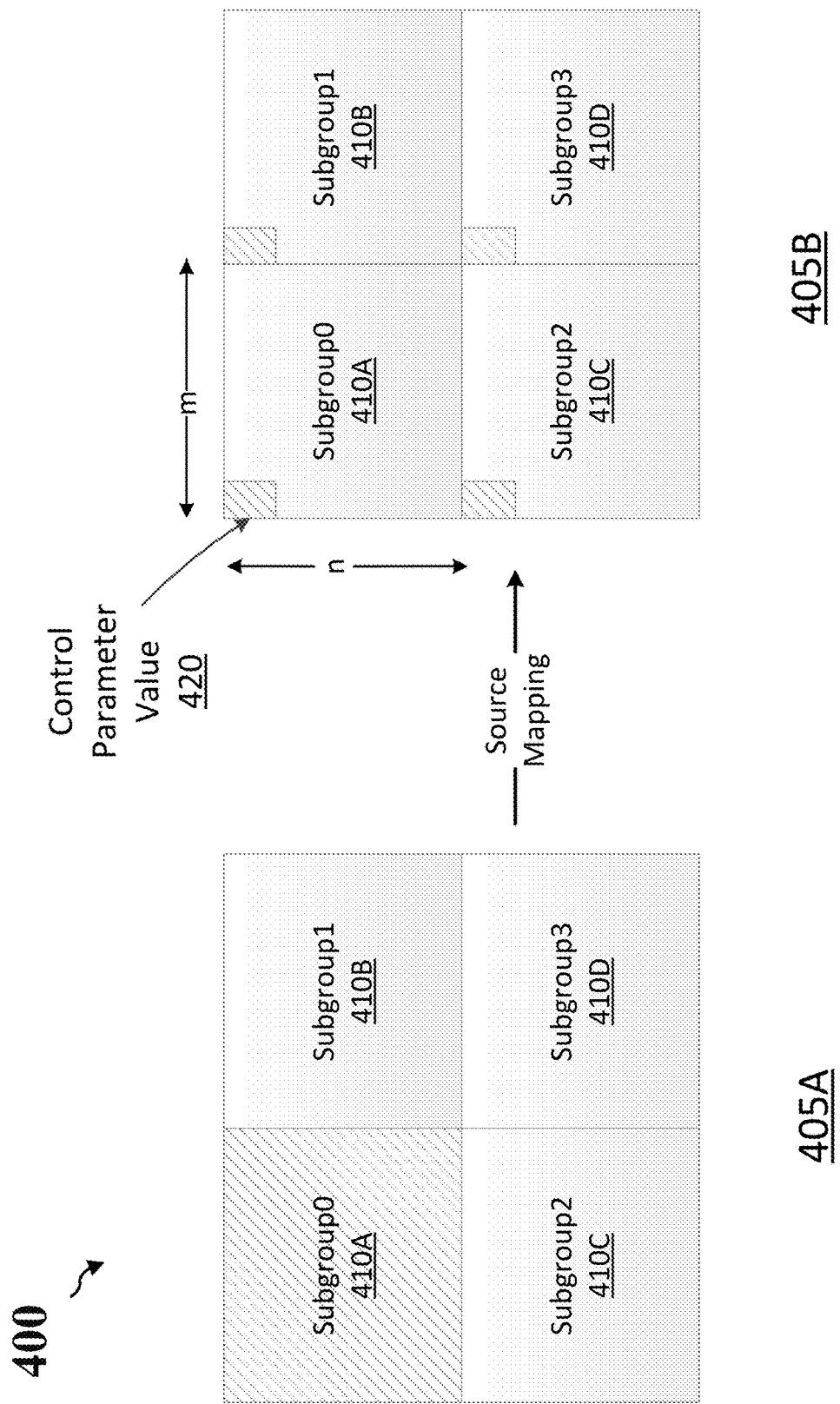
FIG. 4 illustrates an example diagram in accordance with one or more techniques of this disclosure.

FIG. 4 illustrates an example diagram in accordance with one or more techniques of this disclosure. As shown, a comparative example is shown for source mapping between a typical system and an aspect of the techniques described herein. In this aspect, the operation or function performed by the GPU 205 can be a matrix multiple application. In particular instances, the matrix multiply operation can be for image analysis or deep learning operations, such as to indicate at least one of an identification of content of image data, a prediction of a next image in an image sequence of the content including the image data, and an identification of a missing part of the image data.

As shown, the matrix multiple operation can be divided into four parallel tasks, i.e., subgroups 0-3 (subgroups 410A-410D), but it is noted that the operation can be divided into more or less tasks/subgroups in other aspects. As described above, shader logic units in a GPU will typically perform such operations by allocating its local storage to hold all fiber source location data. For example, a plurality of subgroups 410A to 410D is shown as subgroup collection 405A. In this case, subgroup0 is a matrix (n, m) of values and the shader unit would allocate the entire area of the cross-hatching of subgroup0 for the input source data. That is, source data for all values in the matrix (n, m) would need to be allocated to the local memory.

However, according to an aspect of the techniques described herein, only a single fiber source input or data location identifier is required for subgroup0. Thus, the collection 405B shows the same subgroups 0-3, but uses a single fiber source input, i.e., data source control parameter value 420. In this aspect, only the upper left coordinate of each matrix needs to be passed to the local storage (e.g., storage 262) of the shader processor 220, instead of every fiber source location as shown for subgroup0 of collection 405A. As a result, the reduction ratio of consumer memory of the local storage is effective 1 to n*m values. It is noted that while the upper left coordinate of the matrix (n, m) is provided as the control parameter value 420, a different single coordinate value can be used as the control parameter value 420 in other aspects. Moreover, a control parameter value is provided for each of the subgroups 410A-410D as further shown, which is again the upper left coordinate of each matrix for each subgroup.

Referring back to FIG. 3, the control parameter value 420 for each subgroup is loaded as the input location data value 272 to local storage 262 of the shader processor 220. As also described above, the ALU/load engine 198 is configured to decode this control parameter value 420 based on predefined decoding rules, which is single fiber input or data location identifier, to load the input data for the workload of the operation. In an aspect, the input data 274 can be image data that can accessed from internal memory 240 or alternatively from system memory 124. In either case, the ALU/load engine 198 is configured with predetermined rules that enable it to identify the memory addresses of the input data, such as matrix (n, m), from the external memory. Moreover, the ALU/load engine 198 is also configured to load this input data 274 in a fixed or set pattern to local storage 264, which can then be directly accessed by the one or more ALUs 250 when the subgroups are invoked for execution of the operation, which can be a deep learning operation, image processing operation, or the like. The output data generated by the operation of the ALUs 250 is then stored in local storage 266, where it can subsequently be accessed by other components of the image processing elements (e.g., graphics processing pipeline 107). According to these techniques, the required memory used in local storage 262 is effectively reduced or compressed for each subgroup, which effectively frees up memory for additional processes and minimizes data flow for each operation.

As described above, an aspect of techniques described herein configure the one or more shader units 210 to perform an operation, such as a deep learning operation like a matrix multiply operation. In this aspect, the control parameter value 420 defines a mapping of source location input data for the workload of the operation. In another aspect, the control parameter value 420 can also define relationships for the subgroup invocations. For instance, the designated operation for the one or more ALUs 250 can be a FFT (fast Fourier transform) operation of the input data.

Figure 5:
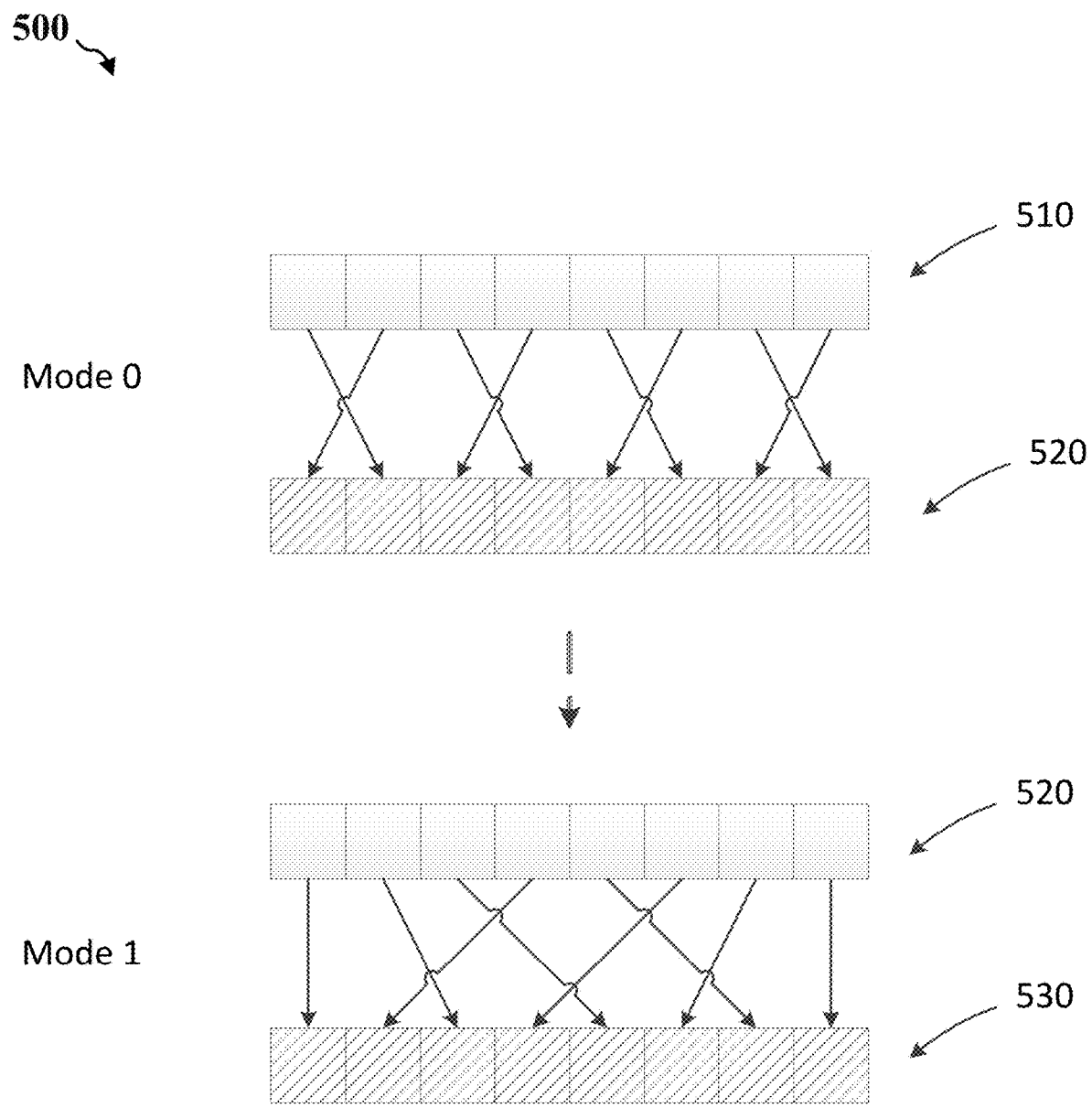
FIG. 5 illustrates an example diagram in accordance with one or more techniques of this disclosure.

FIG. 5 illustrates an example diagram in accordance with one or more techniques of this disclosure. In general, FFT operations are multi-staged or multilayered with the data going from one stage to the next, such the output data of one layer (e.g., a first source) of the computations become the input data (e.g., a first destination) of the latter, and so forth. Moreover, the order and grouping of the data vary from one stage to the next so it is necessary to ensure that correct data is accessed from memory for each computation in the FFT operation.

As shown in FIG. 5, first and second shuffle or reordering modes (e.g., modes 0 and 1) are shown for mapping the source data to the destination data at each stage. More particularly, the first stage of the FFT operation reorders the data values as shown from source data 510 to destination data 520. That is, assuming the row of data values (e.g., the subgroup of n invocations) is from left to right (e.g., values at positions 0-7 for n=8), shuffle mode 0 reorders the data to positions 1, 0, 3, 2, 5, 4, 7, 6. Conventionally, the shader unit 210 would allocate the invocation's location for each destination (i.e., the diagonal cross hatching of the destination values 520). Thus, referring back to FIG. 3, data values for each invocation's location would be stored in local storage 262 as the input source location data 272. According to an aspect, the ALU/load engine 198 can be configured with predefined rules for each shuffle mode or reordering mode. As a result, rather than needing to allocate n values to the local storage 262, the ALU/load engine 198 can allocate a single control parameter value 420 for each layer or stage of the FFT that defines the mode for the subgroup (e.g., the layer or stage of the FFT operation).

FIG. 5 also shows a second shuffle mode (i.e., mode 1). In this instance, the destinations 520 from the first stage become the sources 520 for the second stage of the FFT operation. Moreover, mode 1 shows a reordering of the n source values from left to right (e.g., values at positions 0-7 for n=8) to a reordering of destination data values 530 to positions 0, 3, 1, 5, 2, 6, 4, 7. It should be appreciated that the specific reordering of mode 0 and mode 1 are only for illustrative purposes. Again, in this aspect, the single control parameter value 420 for this stage will be indicative of mode 1 and the ALU/load engine 198 can be configured with predetermined rules that determine the mapping to destinations so that each invocation's location is not required to be loaded to local storage as described above.

In another aspect, the single control parameter value 420 can further define the relationships of the invocations of the subgroup. Thus, in an aspect, the predefined rules can further configure ALU/load engine 198 to determine the order or sequence of the shuffle modes for each stage of the FFT operation. For example, if the single control parameter value 420 identifies "mode 0", the ALU/load engine 198 may be configured, according to the predefined rules, to determine the that next shuffle mode is "mode 1" and so forth. It is further noted that the predefined rules can be generated by a designer of the GPU 205 according to an aspect.

Figure 6:
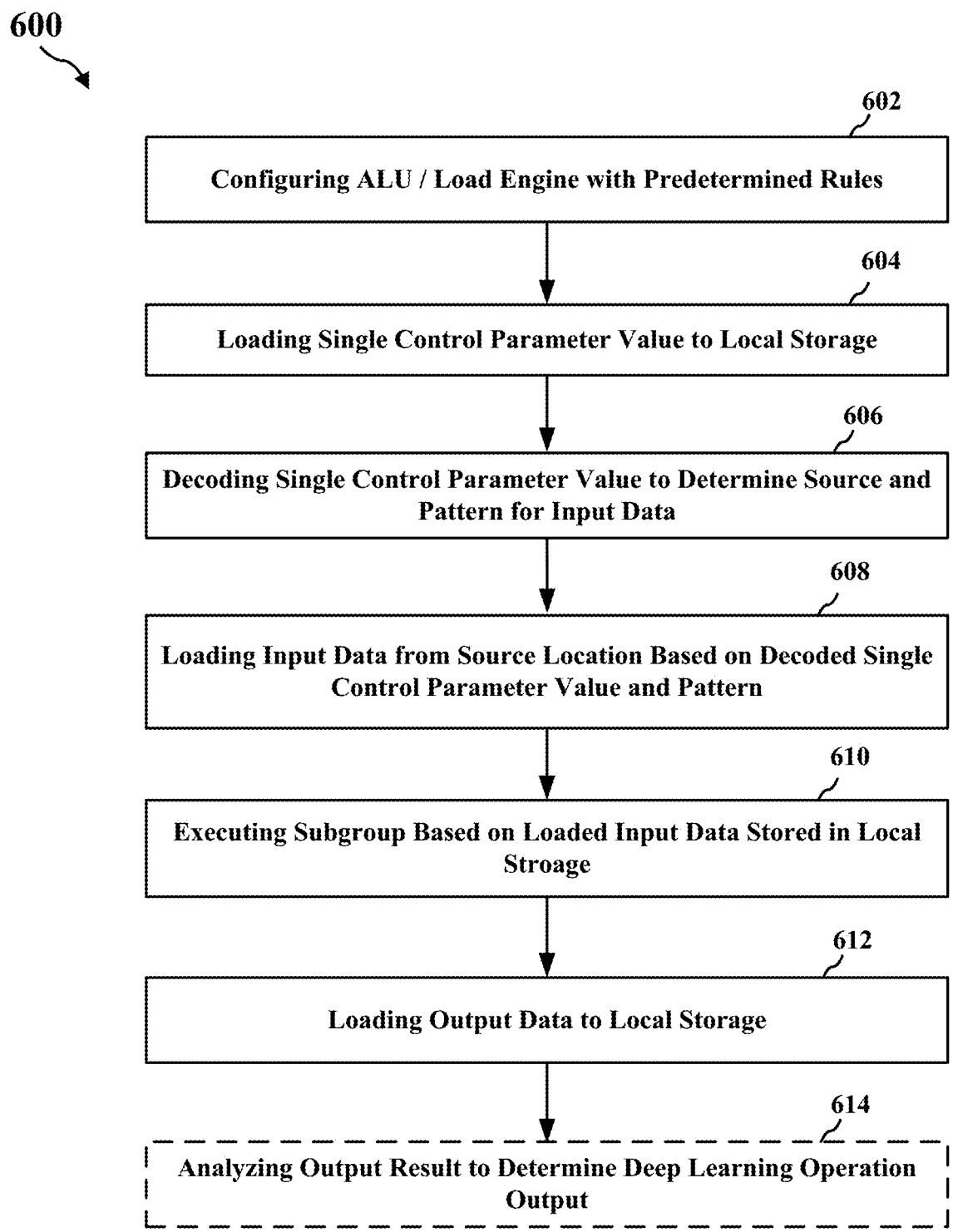
FIG. 6 illustrates an example flowchart of a method in accordance with one or more techniques of this disclosure.

FIG. 6 illustrates an example flowchart 600 of an example method in accordance with one or more techniques of this disclosure. The method may be performed by an apparatus, such as a GPU 205, as described above. In an aspects, the steps highlighted by a dashed box illustrate optional steps in an aspect of the technique described herein.

At block 602, the ALU/load engine 198 can be configured with one or a plurality of predefined rules that enables the ALU/load engine 198 to derive each fiber input location for each subgroup by a single fiber source input (i.e., a single control parameter value 420). The predefined rules can further define the relationships of the invocations of the subgroup.

Next, at block 604, the ALU/load engine 198 can be configured to load the single control parameter value 420 to local storage. For example, if the predefined operation is a matrix multiple operation, the single control parameter value 420 for each subgroup can be the upper left coordinate of each matrix (n, m) corresponding to each subgroup. In a particular instance, the loading of each single control parameter value 420 for each subgroup can be executed as part of a process(es) in a graphics processing pipeline. At block 606, the ALU/load engine 198 can be configured to decode each single control parameter value 420 according to the one or more predefined rules. In an aspect, the decoding of the single control parameter value 420 maps the source location of the input data to the local storage of the GPU 205, and particularly to the shader unit 210 according to an aspect.

At block 608, the ALU/load engine 198 can be configured to load the input data (e.g., the workload of the specified operation) to local storage of the shader unit 210 in an aspect. The specific data values of the input data can be loaded in the local storage according to a pattern (e.g., pattern of memory addresses) that are decoded from the single control parameter value 420. Using this data, the ALU/load engine 198 is further configured to control the ALUs (e.g., ALUS 250) to invoke the particular subgroup for the desired operation at block 610. As noted above, the predefined rules can further define the relationship (e.g., the order) of invocations of subgroups for the task.

At block 612, the output data generated by the ALUs is stored in local storage. Finally, at block 614, the programmable shader unit 210 can analyze the output results of the performed by the ALUs to determine features of the data workload. As a result, the ALUs 250 can be utilized by the GPU 205 for performing deep learning and image processing operations and maximizing use of resources during image processing.

Effectively, the subject matter described herein can be implemented to realize one or more benefits or advantages. For instance, the techniques disclosed herein enable the GPU to reduce the local storage required to invoke each subgroup of an operation, which increases the overall performance of the shader unit(s), which can then issue more subgroups/tasks. As a result the apparatus and method further reduce the power consumption of the GPU 205 since it is loading less data (i.e., the source input data) into the local storage of the shader unit(s). This result in turn improves the overall performance of the GPU since the latency of waiting for ready data is also reduce. Thus, the processing techniques herein can improve or speed up data processing or execution and also improve resource or data utilization and/or resource efficiency.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of intraoperative hardware units, including one or more processors as described above, in conjunction with suitable software and/or firmware.

Various examples have been described. These and other examples are within the scope of the following claims.

What is claimed is:

1. A method for mapping a source location of input data for processing by a graphics processing unit, the method comprising:
configuring a processing element of the graphics processing unit with at least one predefined rule for decoding a data source parameter for a task to be executed by the graphics processing unit;
storing the data source parameter in local storage of the processing element;
decoding, by the processing element, the data source parameter according to the at least one predefined rule to determine a source location of the input data and at least one relationship between invocations of the task;

loading, to the local storage of the processing element, the input data from a plurality of memory addresses of the source location that are determined by the decoded data source parameter;

executing the task, by at least one logic unit of the processing element, on the loaded input data to generate output data; and configuring the at least one logic unit to generate the output data based on a matrix multiply operation, wherein the input data comprises at least one input matrix and the data source parameter comprises a single element value within the at least one input matrix.

2. The method of claim 1, further comprising configuring the at least one logic unit to decode the single element value to determine the source location of the plurality of memory addresses.

3. The method of claim 2, wherein each data input value of the at least one matrix is stored in a respective memory address of the plurality of memory addresses.

4. The method of claim 1, further comprising calculating, by the at least one logic unit, the output data by multiplying the at least one input matrix by one or more additional input matrices to generate the output data.

5. The method of claim 1, further comprising storing the output data in the local storage of the processing element.

6. The method of claim 1, further comprising defining a mode of operation for the at least one logic unit to execute the task.

7. The method of claim 6, wherein the task comprises a fast Fourier transform operation of the loaded input data to generate the output data.

8. The method of claim 7, further comprising configuring the at least one logic unit to determine shuffle instructions for the fast Fourier transform operation based on the defined mode of operation.

9. The method of claim 1, wherein the task executed by the at least one logic unit is a deep learning operation.

10. The method of claim 9, wherein the input data is image data and the output data for the executed deep learning operation indicates at least one of an identification of content of the image data, a prediction of a next image in an image sequence of the content including the image data, and an identification of a missing part of the image data.

11. The method of claim 1, further comprising loading the input data to the local storage of the processing element from the electronic memory that is located external to the graphics processing unit.

12. The method of claim 1, wherein the processing element comprises a shader unit of the graphics processing unit.

13. An apparatus for mapping a source location of input data for processing by a graphics processing unit, the apparatus comprising:
a memory; and
at least one processor coupled to the memory and configured to:
configure a processing element of the graphics processing unit with at least one predefined rule for decoding a data source parameter for a task to be executed by the graphics processing unit;
store the data source parameter in local storage of the processing element;
configure the processing element to decode the data source parameter according to the at least one predefined rule to determine a source location of the input data and at least one relationship between invocations of the task;

load, to the local storage of the processing element, the input data from a plurality of memory addresses of the source location that are determined by the decoded data source parameter;

configure at least one logic unit of the processing element to execute the task on the loaded input data to generate output data; and configure the at least one logic unit to generate the output data based on a matrix multiply operation, wherein the input data comprises at least one input matrix and the data source parameter comprises a single element value within the at least one input matrix.

14. The apparatus of claim 13, wherein the at least one processor is further configured to configure the at least one logic unit to decode the single element value to determine the source location of the plurality of memory addresses.

15. The apparatus of claim 14, wherein each data input value of the at least one matrix is stored in a respective memory address of the plurality of memory addresses.

16. The apparatus of claim 13, wherein the at least one processor is further configured to control the at least one logic unit to calculate the output data by multiplying the at least one input matrix by one or more additional input matrices to generate the output data.

17. The apparatus of claim 13, wherein the at least one processor is further configured to store the output data in the local storage of the processing element.

18. The apparatus of claim 13, wherein the at least one processor is further configured to define a mode of operation for the at least one logic unit to execute the task.

19. The apparatus of claim 18, wherein the task comprises a fast Fourier transform operation of the loaded input data to generate the output data.

20. The apparatus of claim 19, wherein the at least one processor is further configured to configure the at least one logic unit to determine shuffle instructions for the fast Fourier transform operation based on the defined mode of operation.

21. The apparatus of claim 13, wherein the operation executed by the at least one logic unit is a deep learning operation.

22. The apparatus of claim 21, wherein the input data is image data and the output data for the executed deep learning operation indicates at least one of an identification of content of the image data, a prediction of a next image in an image sequence of the content including the image data, and an identification of a missing part of the image data.

23. The apparatus of claim 13, wherein the at least one processor is further configured to load the input data to the local storage of the processing element from the electronic memory that is located external to the graphics processing unit.

24. The apparatus of claim 13, wherein the processing element comprises a shader unit of the graphics processing unit.

25. An apparatus for mapping a source location of input data for processing by a graphics processing unit, the apparatus comprising:
means for configuring a processing element of the graphics processing unit with at least one predefined rule for decoding a data source parameter for a task to be executed by the graphics processing unit;
means for storing the data source parameter in local storage of the processing element;
means for configuring the processing element to decode the data source parameter according to the at least one predefined rule to determine a source location of the input data and at least one relationship between invocations of the task;

means for loading, to the local storage of the processing element, the input data from a plurality of memory addresses of the source location that are determined by the decoded data source parameter;

means for controlling at least one logic unit of the processing element to execute the task on the loaded input data to generate output data; and means for configuring the at least one logic unit to generate the output data based on a matrix multiply operation, wherein the input data comprises at least one input matrix and the data source parameter comprises a single element value within the at least one input matrix.

* * * * *